United States Patent Office 2,853,122
Patented Sept. 23, 1958

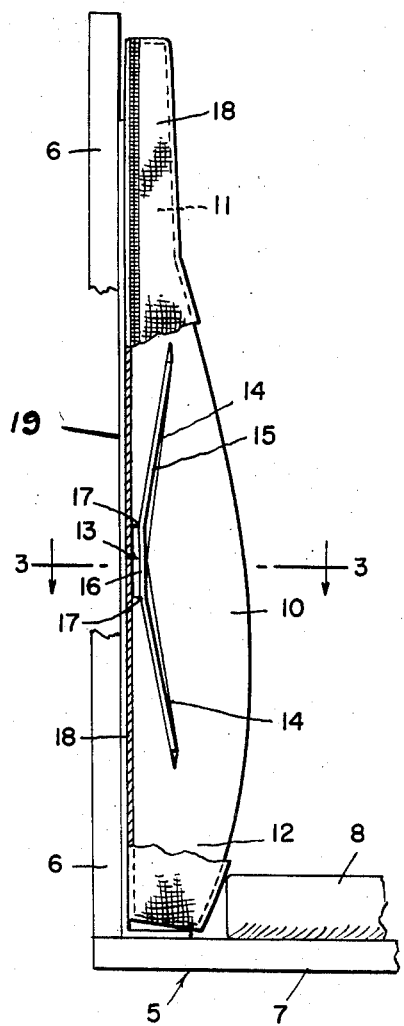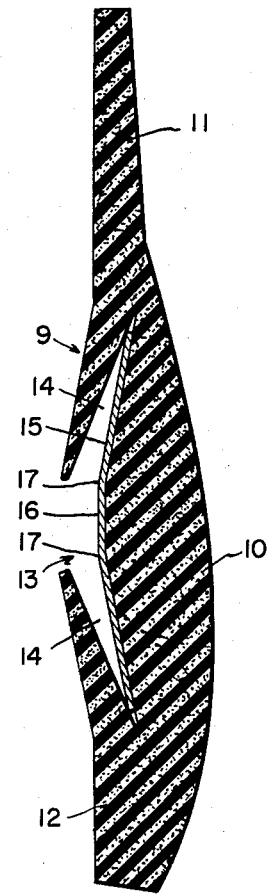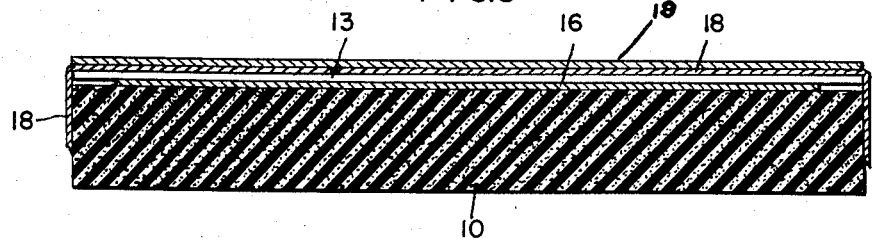

2,853,122

BACK REST OR SUPPORT AND METHOD OF MAKING SAME

Jacob Shapiro, Baltimore, Md.

Application January 17, 1957, Serial No. 634,689

6 Claims. (Cl. 155—179)

The present invention is a back rest for chairs, seats of various miscellany including chairs and seats presently used in airplanes, buses, trucks, automobiles, railway cars, etc., and method of making the rest.

After several years of experiments with back rests of the general type, shown in my Patent No. 2,769,485, filed August 28, 1951, and my combination back rest and cushion seat of my application Serial Number 533,747, filed September 13, 1955, now Patent No. 2,833,340, granted May 6, 1958, I have developed a back rest usable with standard types of chairs and seats, which scientifically braces the back of the user at the locus most effective for orthopedic benefits, but perhaps of greater importance to prevent injury to the lumbo-sacral spine resulting from impacts sustained in vehicular travel, and to mechanically effect proper seating posture for mitigating the possibility of spine deformity.

The objects of this invention therefore are to provide a back rest properly cushioned and equipped with suitable reinforcing means strategically positioned and mobile under pressure to cushion and support the lumbo-sacral spine with resultant orthopedic benefits in addition to affording comfort, and reducing to a minimum back fatigue even under prolonged stress and intermittent impacts incident to vehicular travel in buses, trucks and the like; to provide a back rest wherein the body of the rest is composed of foam rubber, appropriately contoured for the intended purpose, internally reinforced with a unit element both bodily movable and with predetermined limited resilience to move under pressure for coaction with an unyieldable back plate; and to provide a non molding method of embedding the unit member in the foam rubber body which, inter alia, materially reduces the cost of manufacture.

It is within the contemplation of the present invention to provide a back rest for use on conventional chairs and seats as well as a back rest which may be incorporated in a chair back or seat back.

Other objects of the invention will be manifest from the following description of the present preferred form of the invention, taken in connection with the accompanying drawings, wherein:

Fig. 1 is a side elevational view, partly in section, of a back rest constructed in accordance with the present invention, illustrating its application;

Fig. 2 is a vertical sectional view of the cushion per se, with the severed portions of the cushion, above and below the slot in its aft wall, being distended; and Fig. 3 is a horizontal sectional view taken on the line 3—3 of Fig. 1, looking in the direction of the arrows.

In order to illustrate the application of this invention, I have, in Fig. 1, shown a chair or seat 5 of conventional design which includes a vertical portion 6 comprising the seat back and a horizontal part 7 which forms the seat portion. The seat portion 7 may be equipped with a seat cushion 8 of conventional or special design.

The back rest or support of my invention comprises a sponge rubber body 9 which is contoured to provide an enlarged central section 10, the opposite ends of which taper as advantageously illustrated in Figs. 1 and 2. The upper tapered portion of the section 10 issues into a vertical rest portion 11 adapted to engage the upper part of the back of the user. The lower tapered portion of the section 10 issues into a vertical rest portion 12 which is adapted to support the lower portion of the back. It is to be understood that the lower portion 12 of the rest or support may be mounted on top of the seat 7, as shown in Fig. 1, or mounted on top of the seat cushion 8 which latter position is effected by merely elevating the body 9 and moving the seat cushion 8 aft into engagement with the chair back 6. It is also to be understood that the length of the vertical portions 11 and 12 may be varied to conform to different uses to which the back rest or support is put. It is however of the essence of importance in the present invention that the central section 10 of the cushion be equipped with a yieldable metal plate strategically positioned in the central section and insertable therein in a manner to be positively held without the use of extraneous means and without an additional molding operation, etc. To effect this result, the aft wall of the body 9 is slotted, as indicated at 13 and the body incised upwardly from the slot and downwardly therefrom to provide interstices 14 which, as shown to advantage in Fig. 2, communicate with each other and extend forwardly toward the front wall of the central section 10. The interstices 14 are adapted for the reception of a yieldable metal plate 15, the length of which is substantially coextensive with the width of the central section 10. The vertical extent of the plate is coextensive with the combined lengths of the interstices 14. Upon reference to Fig. 2, it will be noted that the contour of the plate conforms to the contoured inner part of the cushion as established by the interstices 14 and slot 13. I have found that best results are obtained if the median portion of the plate, indicated at 16, is formed to lie in a perfectly vertical plane, this being accomplished by bending the plate on lines 17 and 17.

Preferably the sponge rubber body 9 is a unitary structure, shaped and dimensioned substantially as illustrated in Fig. 2 and mounted directly on a chair or seat as shown in Fig. 1 of my Patent No. 2,769,485. If desired, the back rest may be encased in a zippered cover 18, as shown in Fig. 1.

While the back rest above described may be used per se, particularly when positioned against an inflexible, vertical support, I have found that best results are obtained by using an inflexible back member 19 which consists of a metal plate having a vertical and horizontal portion as shown in Fig. 1 of the drawing, this being used in the same manner as the base plate 8 of my Patent No. 2,769,485. Where the base plate is used, the zippered cover 18 may envelope the inflexible back member 19 (base plate) after the fashion shown in Fig. 2 of my Patent No. 2,769,485.

In use of this device, when pressure is exerted by the so-called "small" of the back, on the contoured section 10 of the rest, the upper and lower terminals of the plate 15 will be slightly flexed rearwardly to give a bracing effect to the lumbo-sacral section of the spine.

Actual tests of this back rest in heavy vehicles, with drivers ranging in size from 5′ 7″, weighing 160 pounds to 5′ 11″ weighing 190 pounds, practically eliminated driver fatigue, even when used over long periods of time. By comparison with the ordinary seats of heavy vehicles, driver fatigue manifested itself after relatively short hauls, particularly in cases of drivers who have back conditions in the locus of the lumbo-sacral section.

While I have herein shown and described a preferred embodiment of my invention, it is nevertheless to be understood that various changes may be made therein, without departing from the spirit and scope of the appended claims.

What I claim is:

1. A back rest for chairs or seats, an assembly including an inflexible back member, a foam rubber cushion and a flexible plate floatingly mounted in the cushion, the cushion being provided with a slit and communicating interstices for the accommodation of the plate.

2. The back rest of claim 1 wherein the cushion is a unitary body with the slit and interstices opening through a wall of the cushion.

3. A back rest for chairs or seats, an assembly including a one piece foam rubber contoured cushion and a flexible plate mounted therein, the cushion having a slit in its aft wall at its locus of greatest thickness, the slit communicating with interstices, the latter being adapted for the reception of the plate.

4. A method of making a back rest for chairs or seats which includes incising one wall of a foam rubber body and forming undercuts in said body which diverge from the slit, and then inserting a yieldable plate through the slit and into the interstices.

5. A back support for chairs or seats in combination with an unyieldable back plate, one margin of which is bent at right angles to provide a supporting shelf, a foam rubber cushion mounted on said shelf, the aft wall of the cushion being contiguous to the front wall of the plate body, said cushion being provided with divergent pockets which are in communication through a slot in said aft wall of the cushion, and a yieldable plate mounted in said pockets through the cushion slot, said yieldable plate being flexed when compressive pressure is exerted on the cushion to urge it back against the unyieldable back plate.

6. A back rest for seat or chairs including a one piece foam rubber contoured cushion, the cushion having a slit in its aft wall at its locus of greatest thickness, the slit communicating with interstices which slant inwardly, toward the front of the cushion, above and below the slit, and a yieldable plate mounted in said interstices, the upper and lower ends of the plate complementing the slant of the interstices to project said upper and lower plate ends toward the front of the cushion whereby pressure on said front of the cushion flexes the plate ends rearwardly.

References Cited in the file of this patent

UNITED STATES PATENTS 2,769,485    Shapiro _____ Nov. 6, 1956